Sept. 12, 1967 R. A. FROEHLIG 3,340,999

PHONOGRAPH RECORD ALBUM

Filed Feb. 15, 1966

INVENTOR.
RUDOLPH A. FROEHLIG

BY [signature]

ATTORNEY

United States Patent Office 3,340,999
Patented Sept. 12, 1967

3,340,999

PHONOGRAPH RECORD ALBUM

Rudolph A. Froehlig, Little Neck, N.Y., assignor to Modern Album and Finishing, Inc., College Point, N.Y., a corporation of New York Filed Feb. 15, 1966, Ser. No. 527,605
1 Claim. (Cl. 206—47)

The present invention relates to an improved phonograph record album and more particularly to a phonograph record album adapted to receive phonograph records and the like of different sizes.

Phonograph record albums adapted to accommodate two or more phonograph records are quite common. However, such phonograph record albums are primarily adapted to receive phonograph records of the same size.

Under certain circumstances, it has been found desirable that a second smaller diametered phonograph record such as a 45 r.p.m. phonograph record, may be distributed with the larger phonograph record, such as 33⅓ r.p.m. phonograph record.

One problem encountered under such circumstances is to make the purchaser of the main record aware that he is receiving a premium record. In addition, such premium records should be packaged with the larger record without taking up any appreciable additional space. Furthermore, any such album to accommodate the two records must be able to be manufactured inexpensively.

Applicant's invention has for one of its objects the provision of one improved phonograph record album adapted to receive a plurality of phonograph records of different sizes.

Another object of the present invention is the provision of an improved phonograph record album in which the purchaser can easily determine that a second record is being distributed with the larger record.

Another object of the present invention is the provision of an improved phonograph album which is simple and inexpensive to manufacture and which will enable a second record to be packaged without using any appreciable additional space.

Other and further objects of the invention will be obvious upon an understanding of the illustrative embodiment about to be described, or will be indicated in the appended claim, and various advantages not referred to herein will occur to one skilled in the art upon employment of the invention in practice.

A preferred embodiment of the invention has been chosen for purposes of illustration and description and is shown in the accompanying drawings, forming a part of the specification, wherein.

Figures 1, 2, 3, 4, 5:
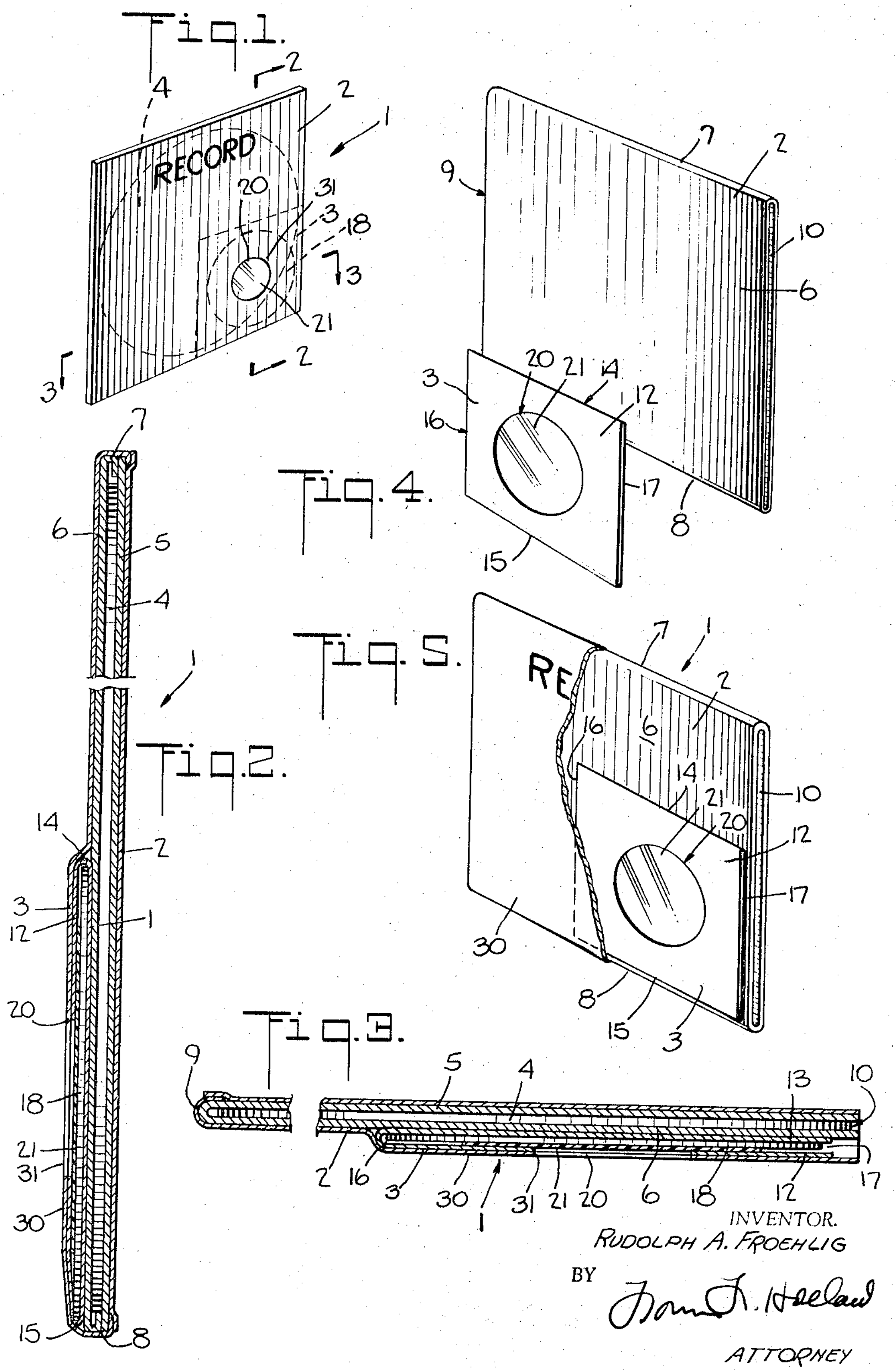
FIG. 1 is a perspective view of a phonograph record album made in accordance with the present invention.
FIG. 2 is a sectional view taken along line 2—2 of FIG. 1.
FIG. 3 is a sectional view taken on line 3—3 of FIG. 1.
FIG. 4 is an exploded perspective view showing two record jackets which are utilized in connection with the present invention.
FIG. 5 is a perspective view showing the assembled phonograph record album of the present invention.

Referring to the drawings the present invention comprises a phonograph record album 1, including a pair of phonograph record holders or jackets 2 and 3 one of which is larger than the other.

The larger jacket 2 is adapted to receive a large phonograph record 4 (such as a 33⅓ r.p.m. phonograph record) and may be made in any desired or conventional manner. The larger jacket 2 has the usual side panels 5 and 6, top wall 7, bottom wall 8 and rear wall 9. Its front end is open as at 10 and is adapted to receive a phonograph record 4 therein. While the side panels 5 and 6 of the jackets are shown in the drawing as not having any windows therein, it will be understood that windows may be provided in either side panel, if desired.

The smaller jacket 3 is also provided with side panels 12 and 13 and has the usual top wall 14, bottom wall 15 and rear wall 16 with its front end 17 open and adapted to receive a smaller phonograph record 18 (which may be a 45 r.p.m. record).

The side panel 12 of the smaller jacket 3 has a window 20 therein, which in the drawing is shown as being circular, so that the label of the smaller phonograph record 18 may be viewed therethrough. The window 20 is covered with a thin transparent sheet 21 in order to protect the label of the record 18. Here again while the preferred embodiment shown in the drawings illustrates the panel 13 of the smaller jacket 3 as being windowless, if desired a window may also be provided in the panel 13.

The jackets 2 and 3 are mounted together in any desired or conventional manner, as, for example, by a suitable adhesive. Preferably the front openings 10 and 17 of the jackets 2 and 3, respectively, face in the same direction so that both phonograph records 4 and 18 in each jacket 2 and 3 may be removed from the same side of the album 1.

The smaller jacket 3 is affixed to the larger jacket 2 in centrally off-set position from the larger jacket, i.e., the center of the smaller jacket 3 is offset from the center of the larger jacket 2. As shown in the drawings the smaller jacket 3 is mounted at the lower front corner of the larger jacket 2. However, the smaller jacket 3 may be mounted at other offset locations on the larger jacket, if desired.

By off-setting the smaller jacket 3 from the larger jacket 2 a purchaser will readily become aware of the fact that a premium record is being distributed with the larger record 4. In other words, he will not mistake the label of the smaller record 18 as being the label of the larger record 4 because the position of the label of the smaller record is off-center.

The jackets 2 and 3 are adapted to have an outer covering 30 wrapped around them. This outer covering 30 is adapted to give the name of artist, recording company and other pertinent information. The covering 30 preferably has a window 31 which is off-center with respect to the larger record and which overlies and is co-extensive with the window 20 in the smaller jacket 3 so that the label of the smaller record 18 can be viewed through the window 31 in the outer covering 30. Here again the off-center position of the window 31 of the outer covering 30 will insure against a purchaser mistaking the label of the smaller record 18 as being the label of the larger record 4.

The manner of using the album of the present invention will be obvious from the above description. The smaller jacket 3 is adhered to or otherwise mounted on the larger jacket 4 in offset relationship to larger jacket 2 so that its window 20 is off-center with respect to the larger jacket 2. An outer covering 30 is wrapped around both jackets 2 and 3 so that its window 31 coincides with the window 20 in the smaller jacket 3. With this structure both phonograph records 4 and 18 may be easily distributed together.

It will be understood that if two smaller records are to be distributed with the larger record, a second smaller jacket similar in structure to jacket 3 may also be mounted on the other side panel 5 of larger jacket 2.

Hence, it will be seen that the present invention provides an improved phonograph record album which is adapted to accommodate records of different sizes, which is simple and inexpensive to manufacture and in which the smaller record may be easily noticed by a purchaser of the larger record.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

A phonograph record album comprising a larger jacket having a front opening for receiving a phonograph record therein, side panels, opposed edge walls and a rear edge wall, a smaller jacket superimposed on said larger jacket comprising a front opening for receiving a phonograph record therein, at least one side wall, opposed side edge walls and a rear edge wall, a window in the side wall of said smaller jacket, the front opening of said two jackets facing in the same direction, a side edge wall and the front opening of the larger jacket being in close proximity to a side edge wall and the front opening of said smaller jacket, an outer covering wrapped around both of said jackets, said outer covering having a window therein coincident with the window in said smaller jacket.

References Cited

UNITED STATES PATENTS

| | | | |
|---|---|---|---|
| 2,026,140 | 12/1935 | Poppe | 229—56 |
| 2,207,142 | 7/1940 | Berkowitz | 229—72 |
| 2,312,964 | 3/1943 | Dickinson. | |
| 2,867,372 | 1/1959 | Fox | 229—56 |
| 2,931,557 | 4/1960 | Loderhose | 206—47 X |
| 3,232,423 | 2/1966 | Smiler | 206—52 |

FOREIGN PATENTS

| | | |
|---|---|---|
| 54,050 | 1/1912 | Austria. |
| 426,682 | 4/1935 | Great Britain. |

OTHER REFERENCES

German printed application 1,005,036 March 1957, ARWA G.m.b.H.

THERON E. CONDON, *Primary Examiner.*

J. M. KASKIE, *Assistant Examiner.*